(No Model.)

H. W. ARMSTRONG.
NUT LOCK.

No. 498,734.          Patented May 30, 1893.

WITNESSES          INVENTOR

UNITED STATES PATENT OFFICE.

HARRY W. ARMSTRONG, OF OAKMONT, ASSIGNOR TO THE VERONA TOOL WORKS, OF PITTSBURG, PENNSYLVANIA.

NUT-LOCK.

SPECIFICATION forming part of Letters Patent No. 498,734, dated May 30, 1893.

Application filed February 6, 1893. Serial No. 461,130. (No model.)

*To all whom it may concern:*

Be it known that I, HARRY W. ARMSTRONG, of Oakmont in the county of Allegheny and State of Pennsylvania, have invented a new and useful Improvement in Nut-Locks, of which the following is a full, clear, and exact description, reference being had to the accompanying drawings, forming part of this specification, in which—

Figure 1:
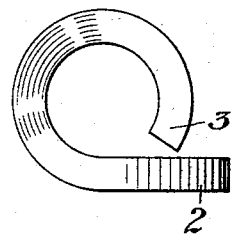
Figure 2:
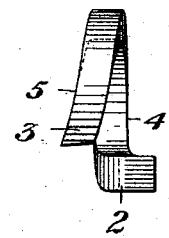
Figure 3:
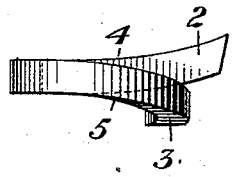

Figure 1 is a plan view of my improved nut-lock. Figs. 2 and 3 are edge views thereof.

My invention belongs to that class of nut-locking devices known as the spring-washer, and is designed to afford a nut-lock having improved qualities of holding the nut.

It consists in a spring-washer of general helical form with a single convolution, one end of the washer projecting substantially tangentially a short distance beyond the other, and the two end portions being preferably somewhat bowed to constitute concavities giving a double spring action to the washer when the nut is screwed home upon it. The bowing of the short arm is more important, since it gives the biting action directly upon the nut.

The washer, as shown in the drawings, is of general helical form, but one end 2 projects substantially tangentially beyond the other, and terminates without having a laterally rectangularly flexed extension which would interfere with the holding action of the washer, would weaken it and increase its cost of manufacture. The two ends 2 and 3 terminate in sharp edges or points adapted to bite into the metal against which they are pressed, and the end-portions of the washer are made oppositely concave as at 4 and 5, affording bow-springs at each side of the washer.

In use, the washer is fitted around the bolt, and the nut is screwed against it in the usual way. The sharp ends bite respectively into the nut and fish-plate or other metal surface against which the washer bears, and hold the same with great security by reason of the spring action afforded by the concave portions 4 and 5. The extension of the end 2, by rendering its bearing on the nut or plate more remote from the center, enhances its holding power and spring action, and prevents the washer from getting into the hole of the fish-plate.

I claim—

A nut-locking washer of general helical form, one end projecting substantially tangentially a short distance beyond the other, and the end portions being oppositely bowed to constitute concavities giving a double spring action; substantially as described.

In testimony whereof I have hereunto set my hand.

HARRY W. ARMSTRONG.

Witnesses:
THOMAS W. BAKEWELL,
W. B. CORWIN.